Figure 1:
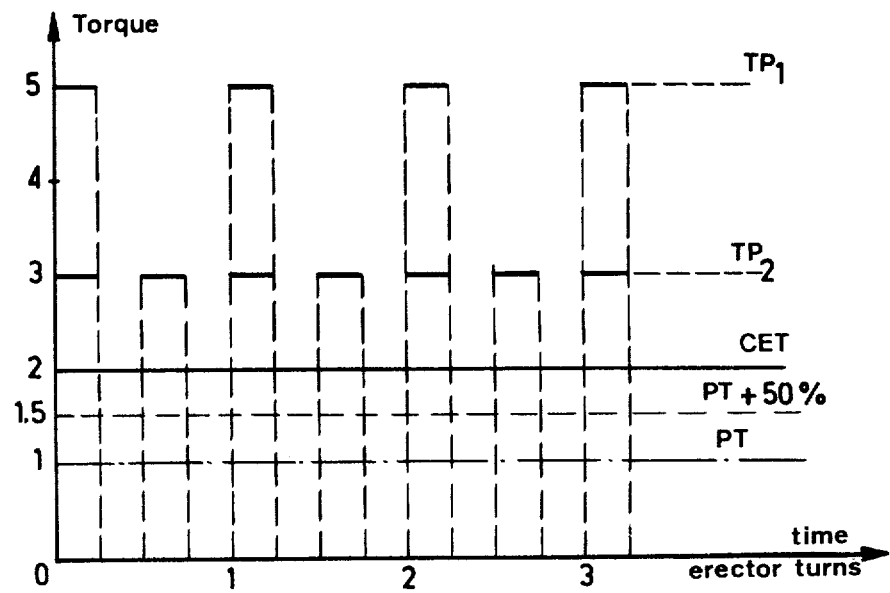

United States Patent [19]

Chombard

[11] 4,377,950

[45] Mar. 29, 1983

[54] VERTICAL GYRO ERECTORS

[75] Inventor: Pierre A. Chombard, Boulogne, France

[73] Assignee: Societe Francaise (SFENA), Velizy Villacoublay, France

[21] Appl. No.: 224,228

[22] PCT Filed: Feb. 26, 1979

[86] PCT No.: PCT/FR79/00018
§ 371 Date: Nov. 3, 1979
§ 102(e) Date: Nov. 2, 1979

[87] PCT Pub. No.: WO79/00698
PCT Pub. Date: Sep. 20, 1979

[30] Foreign Application Priority Data

Mar. 3, 1978 [FR] France ............... 78 06250

[51] Int. Cl.³ ............................................. G01C 19/50
[52] U.S. Cl. ................................. 74/5.44; 74/5.8
[58] Field of Search ........................... 74/5.44, 5.8

[56] References Cited

U.S. PATENT DOCUMENTS

| | | | |
|---|---|---|---|
| 2,351,619 | 6/1944 | Kimball | 74/5.44 |
| 2,356,749 | 8/1944 | Carter | 74/5.44 |
| 2,480,263 | 8/1949 | Raspet | 74/5.44 |
| 2,504,061 | 4/1950 | Alkan | 74/5.44 |
| 2,572,733 | 10/1951 | Konet | 74/5.44 |
| 3,357,263 | 12/1967 | Chombard | 74/5.44 |
| 3,358,515 | 12/1967 | Chombard | 74/5.44 |

FOREIGN PATENT DOCUMENTS

| | | | |
|---|---|---|---|
| 1122053 | 8/1956 | France | 74/5.44 |
| 1416416 | 9/1965 | France . | |
| 555321 | 8/1943 | United Kingdom | 74/5.44 |
| 808075 | 1/1959 | United Kingdom | 74/5.44 |

*Primary Examiner*—Rodney H. Bonck
*Attorney, Agent, or Firm*—Browdy & Neimark

[57] ABSTRACT

The invention concerns a vertical gyroscope rotary mechanical erector. According to the invention, the erector is characterized mainly by the fact that it features only one unstable pendulum (6) while providing the same quality on the vertical as the erectors fitted with at least two pendulums and offering as a further advantage, a greater simplicity and reliability.

5 Claims, 2 Drawing Figures

VERTICAL GYRO ERECTORS

This invention relates to a vertical gyro erector.

From a certain standpoint, prior art erectors for vertical gyros can be divided into two major classes:

Erectors which exert torques of a continuous nature and which are usually electrical or pneumatic;

Rotating mechanical erectors which exert gravity-induced torques of a pulsed nature.

This latter class includes erectors of the type described in French Pat. No. 1,416,416 granted on Sept. 27, 1965.

The difference in manner of operation of these two classes of erectors entails consequences which are due to the fact that the effective erecting torques, that is to say those which cause the required rate of precession or rate of erection are in reality equal to the torques due to the action of the erector less the parasite torques ascribable to the inevitable friction on the gyroscope suspension axes.

It is customary to seek low erection rates in order to minimize errors due to accelerations of the carrier vehicle. However, one is restricted in this respect, firstly in order to limit vertical errors due to parasite torques, and secondly in order to ensure satisfactory reliability in view of the fact that the parasite torques can degrade in time depending on environmental conditions.

In this respect, mechanical erectors offer advantages which will be more clearly understood by referring to FIG. 1 in the accompanying drawing, which, while not rigorously representing the phenomena involved, provides a picture thereof which facilitates comprehension.

The parasite torque (PT) due to the suspension is assumed to have a value 1 and the continuous erecting torque (CET) a value 2. The effective erecting torque has a value of $2-1=1$.

If one considers a two-pendulum erector which consequently delivers two torque pulses ($TP_2$) per erector revolution, each being exerted for a quarter-revolution, then the supposedly constant value of these torques imparting the same rate of precession as the continuous erecting torque in question will have to be equal to 3. In other words, the precession of the gyroscope during the time corresponding to one revolution of the mechanical erector is represented by the rectangular areas which lie above the line 1 standing for the value of the parasite torque. Similarly, the precession of the gyroscope with the continuously torquing erector is represented by the rectangular area above the line 1.

Suppose now that the parasite torque increases by 50% (PT+50%), that is, that it assumes the value 1.5. It will be seen that the area which represents the effect of the continuously torquing erector is halved whereas the areas which represent the effect of the mechanical erector are reduced by only one-quarter. Moreover, if the parasite torque were to double in value, then the continuously torquing erector would become completely ineffective, whereas the mechanical erector would still retain half of its effectiveness.

This means that, all other things being equal, a mechanical erector is markedly more reliable than a continuously torquing erector.

It also means that, while retaining a sufficient assurance of reliability, it is possible to accept for mechanical erectors lower precession rates, which as already explained, are beneficial for the quality of the vertical datum in actual utilization conditions.

Of course, as already stated, the actual phenomena encountered do not obey such simple laws, but their qualitative aspects nonetheless conform with these conclusions.

All prior art erector systems with unstable pendulums, particularly the one described in the aforesaid French Pat. No. 1,416,416, and which offer the above advantage, have at least two unstable pendulums. This requirement stems from the fact that when the gyroscope is vertical, the centre of gravity of the pendulums must lie on the axis of the erector in order to obtain a stable vertical datum.

The present invention relates to a rotating mechanical erector for a vertical gyro, essentially characterized in that it includes only one unstable pendulum, yet achieves the same quality for the vertical datum as erectors having at least two pendulums, with, as additional advantages, greater simplicity and enhanced reliability from the standpoint discussed earlier.

An erector according to this invention is more particularly characterized in that it includes:

a fixed axis parallel to the gyro axis;

an unstable pendulum pivoting around said fixed axis;

a plate rotating about said fixed axis and having a counterweight for counterbalancing the weight of the pendulum when the counterweight and the pendulum are diametrically opposed, their centre of gravity then lying on said fixed axis; and a peg fixed to said plate and engaging between two arms of a fork extending the pendulum, which peg, depending on the direction in which the plate is driven, contacts one of said fork arms when the gyro is vertical; whereby, if the gyro axis is not parallel to the vertical, the pendulum, on reaching a certain position along its circular path, drops responsively to the gravity component perpendicular to the fixed axis until the other arm of its fork contacts the peg fixed to the plate and thereby produces the erecting effect.

The description which follows with reference to the accompanying non-limitative exemplary drawing will give a clear understanding of how the invention can be carried into practice.

Figure 2:
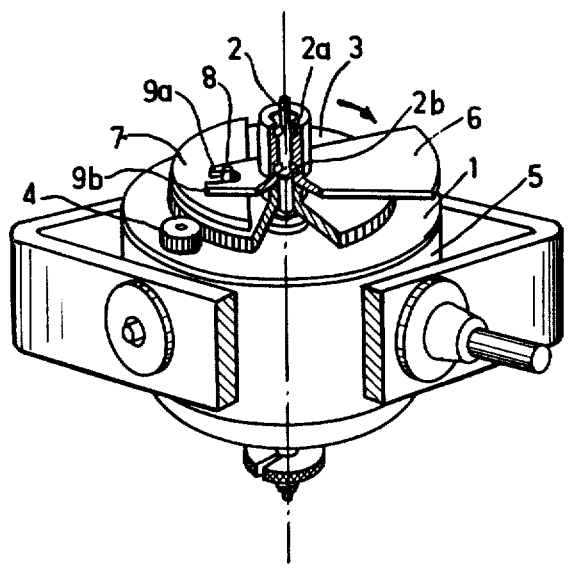

In the drawing:

FIG. 1 represents the torque pulse imparted by a single-pendulum erector according to this invention over a quarter-turn of the erector and producing the same effect as a two-pendulum system; and FIG. 2 is a perspective view in partial section of a single-pendulum erector according to the invention, shown on a gyroscope.

In the illustrated form of embodiment, the cover 1 of the gyro case carries a central fixed axle 2 parallel to the gyro axis.

A circular plate 3 pivotally mounted around fixed axle 2 is rotated at low speed by a pinion 4 which meshes with peripheral teeth on plate 3.

Pinion 4 derives its rotation from the gyro axis through a reduction gearing housed inside case 5 (not shown).

Disposed above plate 3 is an unstable pendulum 6 pivotally mounted about axle 2, preferably through the medium of two ball-bearings 2a and 2b.

Plate 3 is formed with a thicker portion 7 for counterbalancing the weight of pendulum 6 when they are respectively in diametrical opposition. A small vertical peg 8 is fixed to portion 7 and engages between two arms 9a and 9b of a fork forming an extension for pendulum 6, the said fork and pendulum being disposed on either side of the fixed axle.

If plate 3 is assumed to be rotated in the direction of the arrow in the accompanying drawing, then peg 8 will be in contact with arm 9a when the gyroscope is vertical. In this position, the pendulum 6 and the counterbalance-forming portion 7 lie opposite each other whereby their combined centre of gravity lies on axis 2.

Should the gyro axis not be parallel to the vertical, then at a certain point along its circular path pendulum 6 drops responsively to the gravity component perpendicular to axis 2 until arm 9b contacts peg 8. As is known, it is this drop that causes the erecting effect, which effect depends both on the weight of the pendulum and the amount of free travel determined by the gap between arms 9a and 9b.

The erector with a single unstable pendulum, according to this invention, is thus of great simplicity and additionally offers enhanced reliability from the standpoint discussed precedingly. This latter aspect will be more clearly comprehended by an examination of FIG. 1, in which is represented the torque pulse (TP$_1$) delivered by a single pendulum over a quarter-turn of the erector and producing the same effect as a two-pendulum system. This torque must accordingly have a value 5. In the situation previously considered of a 50% increase in parasite torque, the area representing the action of the single-pendulum erector diminishes only by one-eighth; if the parasite torque were to double, the area representing the action of the single-pendulum erector diminishes by only one-quarter.

It goes without saying that changes and substitutions may be made in the preferred exemplary embodiment of the invention described hereinabove without departing from the scope of the invention as set forth in the appended claims.

I claim:

1. A rotating mechanical vertical gyro erector of the type including only one pendulum characterized in that it comprises:
   a fixed axle parallel to the gyro axis;
   an unstable pendulum pivotally mounted around said fixed axle;
   a plate rotating about said fixed axle and having a counterweight for counterbalancing the weight of the pendulum when said counterweight and pendulum are respectively diametrically opposed with their combined centre of gravity then lying on said fixed axle;
   and a peg fixed to the plate and engaging between two arms of a fork extending the pendulum, which peg, depending on the direction in which the plate is rotated, is placed in contact with one of said fork arms when the gyroscope is vertical;
   whereby, in the event of the gyro axis not being parallel to the vertical, the pendulum, upon reaching a certain point in its circular path, drops responsively to the gravity component perpendicular to said fixed axle until the other arm of its fork contacts the peg fixed to the plate thereby to produce the erecting effect, characterized in that the weight of the pendulum and the gap between the fork arms thereof thus cooperate in the erecting effect.

2. An erector as claimed in claim 1, characterized in that the counterweight for counterbalancing the weight of the pendulum is formed by a thicker portion of the rotating plate.

3. An erector as claimed in either claim 1 or 2, characterized in that the peg engaging between the two arms of the fork extending the pendulum is fixed to the counterweight.

4. A rotating mechanical vertical gyro erector of the type including only one pendulum characterized in that it comprises:
   a fixed axle parallel to the gyro axis;
   an unstable pendulum pivotally mounted around said fixed axle;
   a plate rotating about said fixed axle and having a counterweight for counterbalancing the weight of the pendulum when said counterweight and pendulum are respectively diametrically opposed with their combined centre of gravity then lying on said fixed axle;
   and a peg fixed to the plate and engaging between two arms of a fork extending the pendulum, which peg, depending on the direction in which the plate is rotated, is placed in contact with one of said fork arms when the gyroscope is vertical;
   whereby, in the event of the gyro axis not being parallel to the vertical, the pendulum, upon reaching a certain point in its circular path, drops responsively to the gravity component perpendicular to said fixed axle until the other arm of its fork contacts the peg fixed to the plate thereby to produce the erecting effect,
   characterized in that the rotating plate is driven by a pinion which is driven by the gyroscope axis through a reduction gearing.

5. A rotating mechanical vertical gyro erector of the type including only one pendulum characterized in that it comprises:
   a fixed axle parallel to the gyro axis;
   an unstable pendulum pivotally mounted around said fixed axle;
   a plate rotating about said fixed axle and having a counterweight for counterbalancing the weight of the pendulum when said counterweight and pendulum are respectively diametrically opposed with their combined centre of gravity then lying on said fixed axle;
   and a peg fixed to the plate and engaging between two arms of a fork extending the pendulum, which peg, depending on the direction in which the plate is rotated, is placed in contact with one of said fork arms when the gyroscope is vertical;
   whereby, in the event of the gyro axis not being parallel to the vertical, the pendulum, upon reaching a certain point in its circular path, drops responsively to the gravity component perpendicular to said fixed axle until the other arm of its fork contacts the peg fixed to the plate thereby to produce the erecting effect,
   characterized in that the counterweight for counterbalancing the weight of the pendulum is formed by a thicker portion of the rotating plate.

* * * * *